(12) United States Patent
Nakagawa

(10) Patent No.: US 12,538,243 B2
(45) Date of Patent: Jan. 27, 2026

(54) CONTROL METHOD, ACCESS POINT, CONTROL APPARATUS, AND COMPUTER-READABLE STORAGE MEDIUM

(71) Applicant: CANON KABUSHIKI KAISHA, Tokyo (JP)

(72) Inventor: Toshiyuki Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 321 days.

(21) Appl. No.: 18/336,691

(22) Filed: Jun. 16, 2023

(65) Prior Publication Data

US 2023/0413193 A1    Dec. 21, 2023

(30) Foreign Application Priority Data

Jun. 21, 2022    (JP) .................. 2022-099800

(51) Int. Cl.
| | | |
|---|---|---|
| *H04W 88/12* | (2009.01) | |
| *H04W 52/14* | (2009.01) | |
| *H04W 52/24* | (2009.01) | |
| *H04W 52/36* | (2009.01) | |
| *H04W 52/38* | (2009.01) | |

(Continued)

(52) U.S. Cl.
CPC ....... *H04W 52/367* (2013.01); *H04W 52/143* (2013.01); *H04W 52/241* (2013.01); *H04W 52/38* (2013.01); *H04W 72/27* (2023.01); H04W 84/12 (2013.01); H04W 88/12 (2013.01)

(58) Field of Classification Search
CPC ............ H04W 52/367; H04W 52/143; H04W 52/241; H04W 72/27; H04W 84/12; H04W 88/12; H04W 40/24; H04W 24/04; H04W 76/25; H04W 36/08; H04W 36/165; H04W 36/247; H04W 36/304; H04W 60/04; H04W 28/18; H04W 36/385; H04W 36/0061; H04W 36/0094
See application file for complete search history.

(56) References Cited

U.S. PATENT DOCUMENTS

| | | | |
|---|---|---|---|
| 11,438,814 B2 * | 9/2022 | Aio | ............ H04W 36/08 |
| 2015/0004974 A1 * | 1/2015 | Karimi-Cherkandi | ............... H04W 64/003 455/435.2 |

(Continued)

FOREIGN PATENT DOCUMENTS

| | | |
|---|---|---|
| JP | 2016225939 A | 12/2016 |
| JP | 2020145704 A | 9/2020 |

*Primary Examiner* — Cindy Trandai
(74) *Attorney, Agent, or Firm* — Canon U.S.A., Inc., IP Division

(57) ABSTRACT

A control method for controlling a connection destination of a station in a network is provided. In the control method, information is obtained regarding transmission power at a first access point in the network. The first access point performs communication complying with an IEEE802.11 standard and is in communication with a station which is connected to the first access point. Control processing is executed for controlling the first access point and a second access point that performs communication complying with the IEEE802.11 standard. The control processing is performed such that, on a basis that the transmission power is higher than a first predetermined value, the connection destination of the station is changed from the first access point to the second access point.

19 Claims, 6 Drawing Sheets

(51) Int. Cl.
    *H04W 72/27*    (2023.01)
    *H04W 84/12*    (2009.01)

(56) References Cited

U.S. PATENT DOCUMENTS

| | | | | |
|---|---|---|---|---|
| 2015/0146704 | A1* | 5/2015 | Yoon | H04W 48/14 |
| | | | | 370/338 |
| 2016/0183181 | A1* | 6/2016 | Lee | H04W 48/20 |
| | | | | 370/338 |
| 2020/0162889 | A1* | 5/2020 | Desai | H04W 8/12 |
| 2021/0211959 | A1* | 7/2021 | Nakagawa | H04W 36/10 |
| 2021/0297945 | A1* | 9/2021 | Ergen | H04W 48/20 |
| 2022/0070932 | A1* | 3/2022 | Han | H04W 52/243 |
| 2022/0095183 | A1* | 3/2022 | Dionisi | H04W 60/04 |
| 2022/0095416 | A1* | 3/2022 | Akhtar | H04W 24/10 |
| 2023/0080739 | A1* | 3/2023 | Taskin | H04W 84/12 |
| | | | | 370/252 |
| 2023/0093547 | A1* | 3/2023 | Park | H04W 72/27 |
| | | | | 455/522 |
| 2023/0142790 | A1* | 5/2023 | Yan | H04L 45/48 |
| | | | | 370/255 |
| 2023/0232321 | A1* | 7/2023 | Pekarske | H04B 17/318 |
| | | | | 455/434 |
| 2023/0284093 | A1* | 9/2023 | Gauvreau | H04W 28/082 |
| | | | | 370/230 |
| 2023/0308176 | A1* | 9/2023 | Van Wageningen | |
| | | | | H04B 10/1149 |
| 2024/0397399 | A1* | 11/2024 | Gupta | H04W 36/322 |

* cited by examiner

FIG. 4

| Field | Length | Value | Description |
|---|---|---|---|
| tlvType | 1 octet | 0xXX | Transmit Power Level TLV |
| tlvLength | 2 octets | Variable | Number of octets in ensuring field |
| tlvValue | 1 octet | k | STA list count k |
| | 6 octets | Variable | STA MAC address |
| | 1 octet | Variable | Transmit power level for STA |
| | The above 2 fields are repeated k-1 times | | |

CONTROL METHOD, ACCESS POINT, CONTROL APPARATUS, AND COMPUTER-READABLE STORAGE MEDIUM

BACKGROUND

Field

The present disclosure relates to a connection control technique of a wireless LAN.

Description of the Related Art

The Wi-Fi® Alliance has formulated the Wi-Fi EasyMesh standard for a multi-AP network formed by a plurality of (one or more) access points (APs). In the Wi-Fi EasyMesh standard, various kinds of control in a multi-AP network are defined, and control messages when a station (STA) connected to a multi-AP network changes the wireless network of the connection destination are defined. In the multi-AP network, a STA connected to an AP switches the AP of the connection destination, and a seamless communication service can thus be provided to the STA. Japanese Patent Laid-Open No. 2020-145704 describes a technique in which, if communication quality falls below a predetermined value in an STA connected to one AP in a multi-AP network, the connection destination of the STA is switched to another AP. Also, Japanese Patent Laid-Open No. 2016-225939 describes a technique in which if there exists an AP capable of obtaining a better communication environment than another AP connected to an STA, the connection destination of the STA is switched to the AP capable of obtaining the better communication environment.

In the techniques described in Japanese Patent Laid-Open Nos. 2020-145704 and 2016-225939, the condition of switching the connection destination is that the quality of the radio environment between the STA and the connected AP is lower than in a case of connection to an AP on the periphery. For this reason, during the period when connection destination switching occurs, the communication environment in the STA may be insufficient, and it may be impossible to provide a wireless communication service of sufficient quality to the STA.

SUMMARY

Various embodiments of the present disclosure provide techniques for improving communication quality in a station in a wireless LAN network where the wireless LAN network includes a plurality of access points.

According to one embodiment of a present disclosure, there is provided a control method for controlling a connection destination of a station in a network. The method includes obtaining information regarding transmission power at a first access point in the network, the first access point performing communication complying with an IEEE802.11 standard and being in communication with a station which is connected to the first access point; and executing, on a basis that the transmission power is higher than a first predetermined value, control processing for controlling the first access point and a second access point of the network such that the connection destination of the station is changed from the first access point to the second access point, wherein the second access point performs communication complying with the IEEE802.11 standard.

Further features of the present disclosure will become apparent from the following description of exemplary embodiments with reference to the attached drawings.

BRIEF DESCRIPTION OF THE DRAWINGS

FIG. 4 is a view showing an example of a format used by an agent of the multi-AP network to make a notification of transmission power information.

DESCRIPTION OF THE EMBODIMENTS

Figure 1:
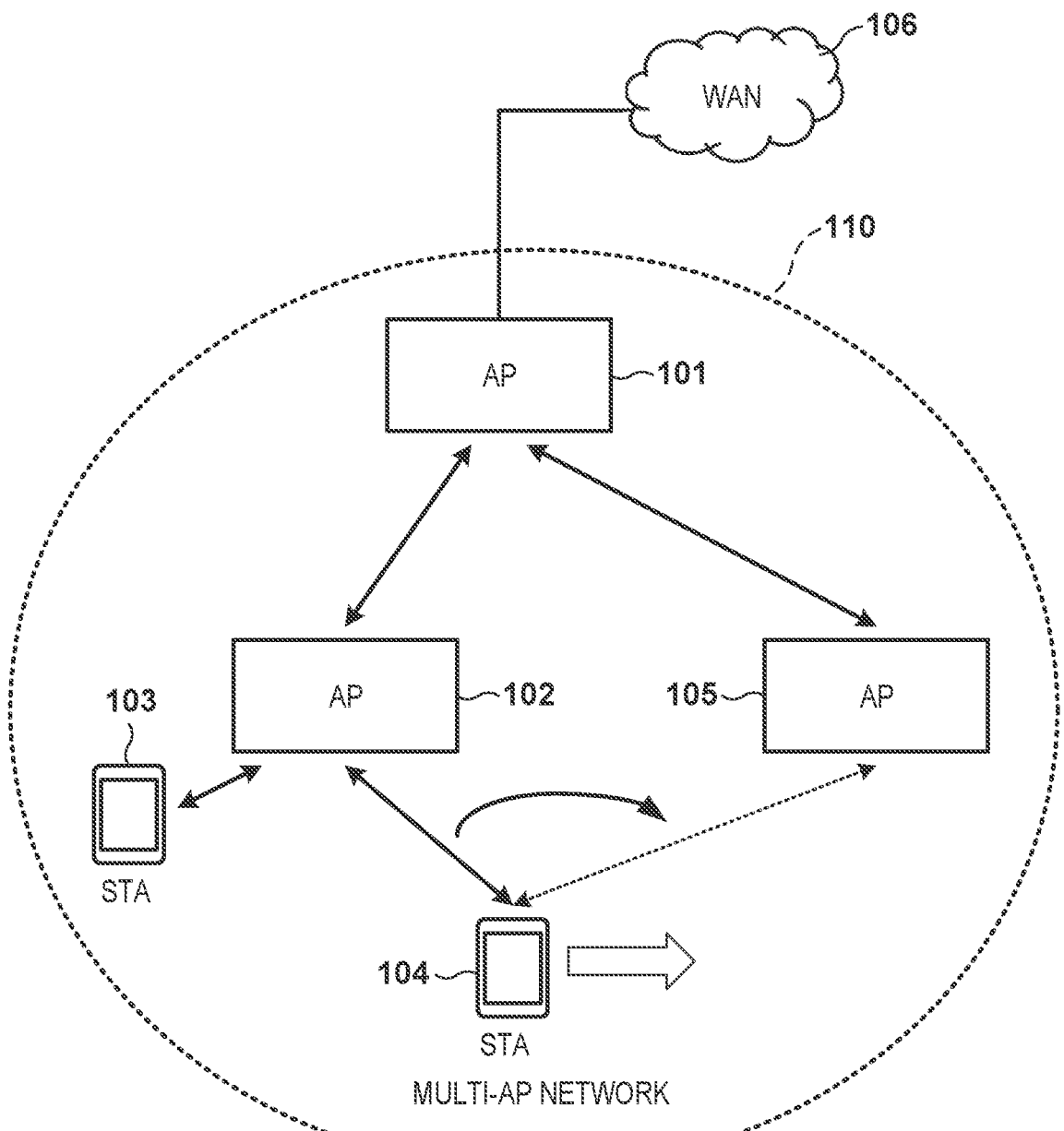
FIG. 1 is a view showing an example of the configuration of a wireless communication system.

Hereinafter, example embodiments will be described in detail with reference to the attached drawings. Note, the following example embodiments are not intended to limit the scope of the claimed invention. Multiple features are described in the example embodiments, but limitation is not made to embodiments that requires all the features that are described, and multiple such features may be combined in different embodiments as appropriate. Furthermore, in the attached drawings, the same reference numerals are given to the same or similar configurations, and redundant description thereof is omitted.

(System Configuration)

FIG. 1 shows an example of the configuration of a wireless communication system according to this embodiment. This wireless communication system is configured to include access points (an AP 101, an AP 102, and an AP 105) and stations (an STA 103 and an STA 104), which are communication apparatuses capable of executing communication complying with the Wi-Fi EasyMesh standard. Here, the AP 101, the AP 102, and the AP 105 construct a multi-access point network (multi-AP network 110) complying with the Wi-Fi EasyMesh standard. The STA 103 and the STA 104 are connected to the multi-AP network 110. Note that the AP 101 is connected to a wide area network (WAN 106) and can, for example, relay the communication of the AP 102, the AP 105, the STA 103, and the STA 104 and establish connection between these communication apparatuses and the WAN 106.

Note that in this embodiment, a case where a wireless communication system complying with the Wi-Fi EasyMesh standard is used will be described. However, it is not intended to limit the present invention to the Wi-Fi EasyMesh standard. For example, the following explanation can be applied to a wireless communication system using the IEEE802.11s standard associated with a wireless LAN mesh network in the IEEE802.11 series standards.

The AP 101 operates in the role of a controller (control apparatus) that has a function of controlling the remaining APs to control the entire multi-AP network 110. The remaining APs controlled by the controller such as the AP 101 each operate in the role of an agent that has a function of notifying the controller of network information under the management of the controller. The controller, for example, transmits a predetermined control message, thereby controlling the connection channel or transmission power of each agent. Also, the controller can perform control for changing a Basic Service Set (BSS) connected to an agent and also changing the BSS of the connection destination of an STA. The controller also executes other control operations such as control of data traffic or diagnosis of a network. As network information, an agent notifies the controller of, for example, the capability information of its own or the capability information of STAs or other APs connected to the agent. Note that the other APs can be connected to the agent using the STA function of a multi-AP device called a backhaul STA. Note that the multi-AP device is a device functioning as the controller or an agent of a multi-AP network. The capability information can include, for example, High Throughput (HT) Capability and Very High Throughput (VHT) Capability defined by the IEEE802.11 standard. The network information may also include the information of the connection channel of the wireless LAN, information about electric wave interference, a notification of connection or disconnection of an STA, information for notifying a change in topology, the metrics information of a Beacon frame, and the like.

Note that the AP operating as the controller may have the function of the agent or may operate as the agent concurrently with operating as the controller. In an example, all the AP 101, the AP 102, and the AP 105 can have both the function of the controller and the function of the agent. In the Wi-Fi EasyMesh standard, the number of controllers in one multi-AP network is defined as one, and a plurality of agents are allowed to exist. Hence, in this embodiment, of the AP 101, the AP 102, and the AP 105, the AP 101 operates as the controller, and the AP 102 and the AP 105 operate as agents. In addition, after establishing wireless connection to the AP 102, the STA 104 moves to gradually separate from the AP 102 and approach the AP 105. Along with the movement, the STA 104 is controlled to change the connection destination from the AP 102 to the AP 105. On the other hand, the STA 103 does not move and does not change the connection destination. Note that the AP of the connection destination will sometimes be referred to as the network of the connection destination or the BSS of the connection destination hereinafter. For example, a change of the connection destination will sometimes be referred to as transfer of the BSS.

Note that the connection between the AP 101 serving as a controller and the AP 102 or the AP 105 serving as an agent may be established not wirelessly but by wire. For example, the AP 101 may be connected to STAs using a wireless communication function and simultaneously connected to the AP 102 or the AP 105 using a wired communication function. In an example, the AP 101 may be an access point of the wireless LAN or may be a controller that does not have the function of an access point of the wireless LAN as long as it has a controller function for controlling the remaining APs.

Note that in an example, each of the AP 101, the AP 102, and the AP 105 can be a wireless LAN router, a Personal Computer (PC), a tablet terminal, a smartphone, a TV, a printer, a copying machine, a projector, or the like. However, these are merely examples, and the AP 101, the AP 102, and the AP 105 may each be any electronic apparatus as long as these have a function as a communication apparatus capable of executing functions to be described later.

(Apparatus Configuration)

Figure 2:
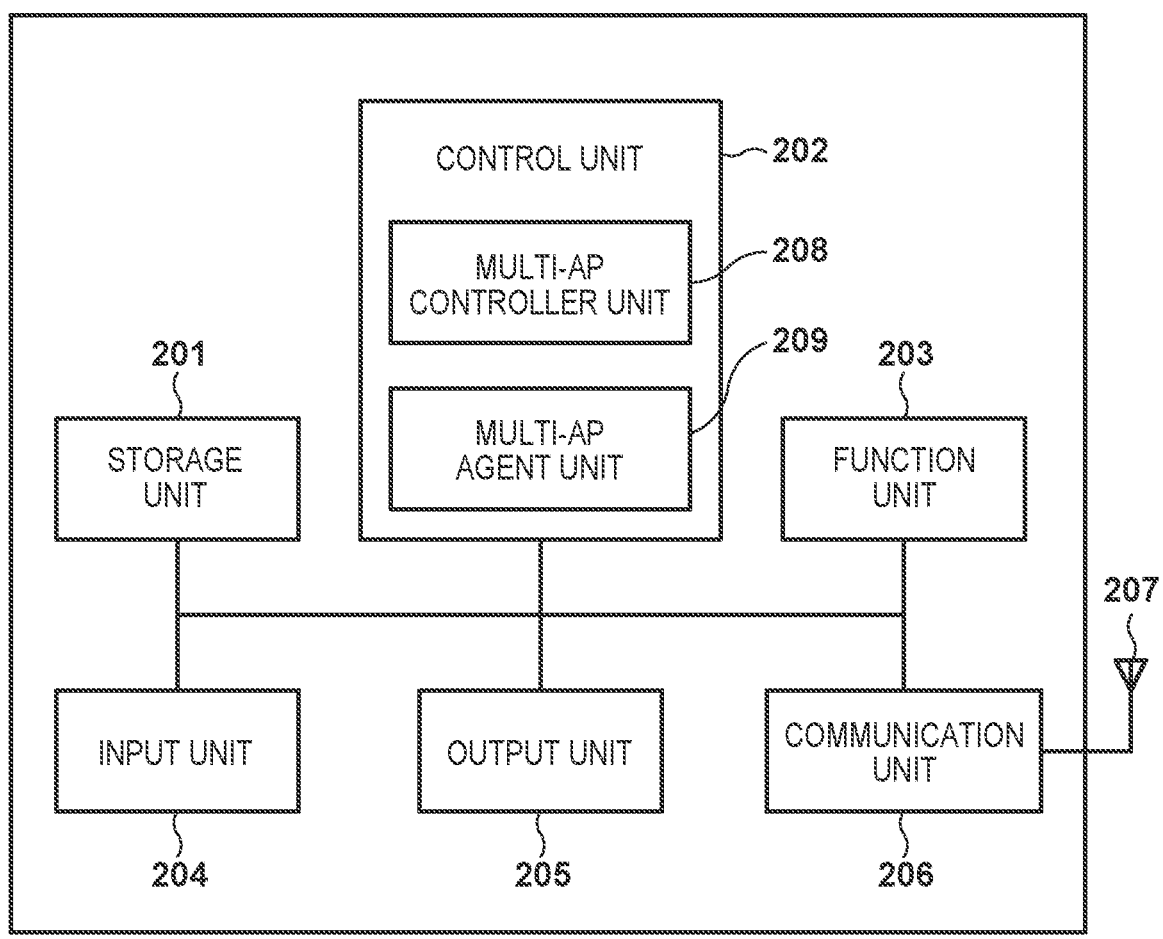
FIG. 2 is a view showing an example of the configuration of a communication apparatus.

FIG. 2 shows an example of the hardware configuration of the AP 101 according to this embodiment. Note that the AP 102 and the AP 105 can have the same configuration as the AP 101. The AP 101 includes, for example, a storage unit 201, a control unit 202, a function unit 203, an input unit 204, an output unit 205, a communication unit 206, and an antenna 207.

The storage unit 201 is configured to include one or more memories such as a Read Only Memory (ROM) and a Random Access Memory (RAM). The storage unit 201 stores programs configured to cause the AP 101 to perform various kinds of operations to be described later and information such as communication parameters for wireless communication. Note that as the storage unit 201, one or more storage media such as a flexible disk, a hard disk, an optical disk, a magneto-optical disk, a CD-ROM, a CD-R, a magnetic tape, a nonvolatile memory card, and a DVD may be used in place of or in addition to the above-described memories.

The control unit 202 can be configured to include one or more processors such as a Central Processing Unit (CPU) and a Micro Processing Unit (MPU). The control unit 202 controls the whole AP 101 by, for example, executing the programs stored in the storage unit 201. The control unit 202 can execute various kinds of control by cooperation between the programs stored in the storage unit 201 and an Operating System (OS). Also, the control unit 202 may include a plurality of processors such as a multicore processor.

Additionally, of programs functioning as a multi-AP controller unit 208 and a multi-AP agent unit 209, which are stored in the storage unit 201, the control unit 202 executes at least one function decided by the setting or operation of the AP 101. If the AP 101 simultaneously functions as a controller and an agent, the functions of both the multi-AP controller unit 208 and the multi-AP agent unit 209 are enabled. If the AP 101 functions as a controller but not as an agent, the function of the multi-AP controller unit 208 is enabled, and the function of the multi-AP agent unit 209 is disabled (not enabled). If the AP 101 functions as an agent but not as a controller, the function of the multi-AP controller unit 208 is disabled (not enabled), and the function of the multi-AP agent unit 209 is enabled. Note that if the AP 101 never operates as a controller, it may not include the multi-AP controller unit 208. Similarly, if the AP 101 never operates as an agent, it may not include the multi-AP agent unit 209.

The multi-AP controller unit 208 controls the multi-AP network 110 by outputting an instruction to an agent based on network topology information or discovery information that the AP 101 receives from the agent. The multi-AP agent unit 209 transmits network topology information or discovery information to another communication apparatus functioning as the controller and executes communication control based on an instruction from the communication apparatus. The network topology information is transmitted/received by, for example, a 1905 Topology Notification message or a 1905 Topology Response message based on the specifications of Wi-Fi EasyMesh. The discovery information is transmitted/received by, for example, a 1905 AP-Autoconfiguration Search message or a 1905 AP-Autoconfiguration Response message. These are messages based on the Wi-Fi EasyMesh standard. Based on these pieces of information, the controller transmits a Client Association Control Request message defined as a multi-AP control message in the Wi-Fi EasyMesh standard. The controller can thus inhibit an STA from being connected to a first predetermined BSS in the multi-AP network and explicitly connect the STA to a second predetermined BSS. Conventionally, an STA performs roaming (switching of an AP of a connection destination) of specifying an appropriate AP from a plurality of APs based on a received signal strength or communication quality and switching the BSS. However, the criterion for determining whether to perform roaming depends on the hardware or software of the STA. On the other hand, in this embodiment, since the controller controls roaming of the STA, the AP of the connection destination of the STA can be changed without depending on the roaming function of the STA.

The function unit 203 executes predetermined processing such as printing or projection under the control of the control unit 202. The function unit 203 is, for example, hardware used by the AP 101 to execute predetermined processing. For example, if the AP 101 is a printer, the function unit 203 is a print unit and performs print processing. If the AP 101 is a projector, the function unit 203 is a projection apparatus and performs projection processing. If the AP 101 is a scanner, the function unit 203 is a reading apparatus and performs reading processing. Data to be processed by the function unit 203 may be data stored in the storage unit 201 or may be data communicated with another communication apparatus via the communication unit 206 to be described later.

The input unit 204 is configured to include a pointing device such as a mouse and hardware that accepts various kinds of operations from the user via voice input, a button operation, or the like. The output unit 205 is configured to include hardware that performs various kinds of outputs to the user. The output by the output unit 205 includes one or more outputs capable of presenting information to the user, such as display of an image by a liquid crystal display, visual output by lighting of a lamp using a light-emitting diode, a voice output by a speaker, and a vibration output. Note that both the input unit 204 and the output unit 205 may be implemented by one module such as a touch panel display.

The communication unit 206 performs control of a wireless LAN complying with the IEEE802.11 series that is the protocol of a data link layer or control of wired communication such as a wired LAN based on the IEEE802.3 standard. The communication unit 206 also performs control of IP communication that is the communication protocol of a network layer. The communication unit 206 can execute a protocol according to the IEEE1905.1 standard on a communication path established in accordance with the IEEE802.11 standard or the IEEE802.3 standard. Hence, the AP 101 can perform control of at least one of a controller and an agent complying with the Wi-Fi EasyMesh standard. Note that the IEEE1905.1 standard is a standard that defines the protocol located in a layer between the data link layer and the network layer. Note that this is merely ab example, and this embodiment can be applied to a communication apparatus complying with another wireless communication method such as Bluetooth °, NFC, UWB, ZigBee, or MBOA or a communication apparatus complying with another wired communication method as well. Here, NFC is short for Near Field Communication, and MBOA is short for Multi Band OFDM Alliance. UWB is short for Ultra WideBand, and includes wireless USB, wireless 1394, and WiNET. In addition, the communication unit 206 controls the antenna 207 to transmit/receive a radio signal for wireless communication.

(Procedure of Processing)

Figure 3:
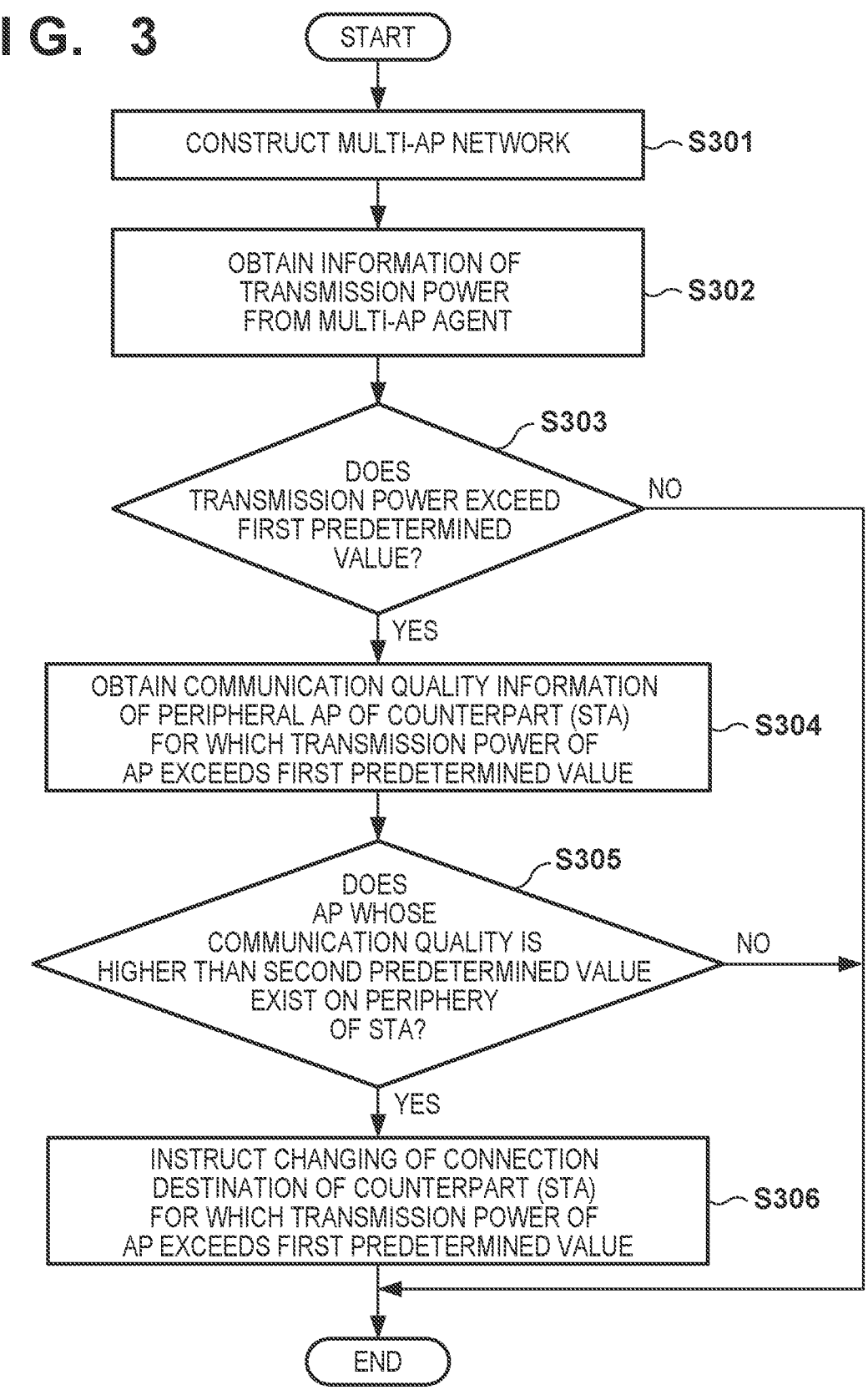
FIG. 3 is a flowchart showing an example of the procedure of processing executed by the controller of a multi-AP network.

The procedure of processing executed in the wireless communication system will be described next. First, an example of the procedure of processing executed by the controller of the multi-AP network will be described with reference to FIG. 3. For example, if the AP 101 operates as the controller of the multi-AP network 110, processing shown in FIG. 3 is executed. Note that the AP 102 or the AP 105 can execute the processing shown in FIG. 3 when operating as the controller of the multi-AP network. Each processing step shown in FIG. 3 is implemented by, for example, the control unit 202 reading out a program stored in the storage unit 201 and executing it. At least part of the processing shown in FIG. 3 may be implemented by hardware. For example, a dedicated circuit automatically generated on an FPGA using a predetermined compiler from a program corresponding to at least some processing steps can be used as hardware corresponding to some processing steps. Note that FPGA is short for Field Programmable Gate Array. The hardware configured to implement at least some processing steps may be formed by forming a Gate Array circuit, like the FPGA. At least some processing steps may be implemented by an Application Specific Integrated Circuit (ASIC).

In this processing, first, by the multi-AP controller unit 208, the AP 101 constructs a multi-AP network in accordance with an instruction from the user (step S301). The AP 101 can construct a multi-AP network using Wi-Fi Protected Setup (WPS) or Device Provisioning Protocol (DPP) in accordance with, for example, the Wi-Fi EasyMesh standard. WPS and DPP are standards formulated by the Wi-Fi Alliance for the setting of a wireless LAN, and are standards that enable wireless LAN setting or encryption without forcing the user to do a complex setting operation. Note that the AP 101 may construct the multi-AP network using a method other than these methods and protocols.

Also, each AP constructing multi-AP network activates a predetermined function in accordance with the Wi-Fi EasyMesh standard to operate as a controller or an agent. For example, an AP functioning as an agent activates the STA function of a multi-AP device called a backhaul STA to participate in the multi-AP network, and starts participation processing to the multi-AP network. Also, the AP functioning as an agent activates the AP function of a multi-AP device called a fronthaul AP, and waits for connection from a peripheral STA or a backhaul STA activated in another AP. On the other hand, an AP functioning as a controller activates not the backhaul STA function but only the fronthaul AP function.

Next, by the multi-AP controller unit 208, the AP 101 obtains information of transmission power (Tx Power) from each multi-AP agent (step S302). Transmission power is transmission power in a predetermined frequency bandwidth (for example, a channel or a resource unit that is the smallest unit of a resource obtained by dividing an existing channel width into smaller sub-channels), and is power of a signal to be supplied from the communication unit 206 to the antenna 207. Note that processing from step S302 is executed for each of STAs connected to the multi-AP network 110.

The AP 101 may obtain the transmission power information by, for example, transmitting a request message for requesting information to each agent or may receive transmission power information reported from each agent without transmitting such a request message. Also, the AP 101 can obtain the transmission power information at an arbitrary timing. For example, the AP 101 may periodically obtain the transmission power information at a predetermined period or may obtain the transmission power information at any time based on participation of an STA in the multi-AP network. Note that in the Wi-Fi EasyMesh standard, if an STA participates in the BSS of the multi-AP network or secedes from the BSS, the agent transmits a 1905 Topology Notification message to the controller. Thus, the agent notifies the controller of the change of the network topology. The controller can detect, based on the message, that the STA has participated in the multi-AP network or seceded from the multi-AP network and can request transmission power information from the agent accordingly.

Note that when requesting transmission power information from the agent, the controller can use, for example, a control message in a format defined by the above-described IEEE1905.1 standard. The Wi-Fi EasyMesh standard defines that the control message used in the multi-AP should be transmitted using a 1905 Control Message Data Unit (CMDU) format. A 1905 CMDU header includes a Message Type field for identifying the type of the message. To show that the message is the control message of the multi-AP, a specific value of a reserved region, which is not assigned to a specific message type at the point of time of the present application, can be assigned to this field. To the request and the response of transmission power information as well, a reserved value at the point of time of the present application can be assigned as a value stored in the Message Type field of the 1905 CMDU header. In a case where an agent reports transmission power information to the controller as well, similarly, a control message in the format defined by the IEEE1905.1 standard can be used. In this case, a Type-Length-Value (TLV) format to be described later with reference to FIG. 4 can be included in the control message.

Next, by the multi-AP controller unit 208, the AP 101 determines whether the value of transmission power represented by the transmission power information obtained from the agent exceeds a first predetermined value (step S303). The determination here is performed to specify an STA that is the target of transfer of the BSS of the connection destination in step S306 to be described later. The AP 102 and the AP 105 set the transmission power such that the received power of an electric wave in each connected STA falls within a predetermined value range. Hence, the smaller the transmission loss is, and the more excellent the communication environment is, the smaller the transmission power is. The larger the transmission loss is, the larger the transmission power is. Hence, it can be evaluated that it may be impossible to provide a communication service of sufficient communication quality to an STA for which the transmission power is larger than the first predetermined value, and the transmission loss is large. For this reason, whether to transfer the AP (BSS) of the connection destination can be decided for each STA depending on whether the transmission power exceeds the first predetermined value. Note that the AP 101 may determine whether the latest transmission power exceeds the first predetermined value, or may determine whether the obtained transmission power, including the latest transmission power, exceeds the first predetermined value continuously a predetermined number of times. The AP 101 may determine whether the transmission power exceeds the first predetermined value for a predetermined period. The AP 101 may determine whether the statistic value such as the average value or median of the transmission power obtained for a predetermined period or a predetermined number of times exceeds the first predetermined value.

If the transmission power to an STA does not exceed the first predetermined value (NO in step S303), the communication environment in the STA is sufficiently excellent, and even if the communication quality lowers, the communication quality can be improved by raising the transmission power. Hence, the AP 101 ends the processing without transferring the BSS of the connection destination for the STA. On the other hand, if the transmission power to the STA exceeds the first predetermined value (YES in step S303), the transmission loss between the STA and the AP connected to the STA is assumed to be large. It is therefore determined that the STA is in a state to change the BSS. Note that the first predetermined value can be set to a value smaller than the maximum value of transmission power. That is, even in a state in which a degradation of the communication quality has not occurred yet in the STA, the transmission power to the STA may exceed the first predetermined value. According to this, before the communication quality actually lowers, it is possible to change the BSS of the connection destination of the STA and continuously provide the communication service of high quality to the STA.

If the transmission power to the STA exceeds the first predetermined value (YES in step S303), the AP 101 obtains communication quality information concerning peripheral APs for the STA (step S304). The AP 101 can obtain by, for example, transmitting to the agent a message for requesting communication quality information on the periphery of a STA connected to the agent, the communication quality information concerning the peripheral APs for the STA. The AP 101 can obtain the communication quality information using, for example, an Associated STA Link Metrics Query/Response message defined by the Wi-Fi EasyMesh standard. The Associated STA Link Metrics Query/Response message is a message used for query/response of the link index of the connected STA. The AP 101 may obtain the communication quality information using an Unassociated STA Link Metrics Query/Response message. The Unassociated STA Link Metrics Query/Response message is a message used for query/response of the link index of an unconnected STA. Also, each message includes the MAC address of the STA, an electric wave strength in the reception channel of the uplink (a link in the direction from the STA to the AP) for each STA, information about the communication speed of the link, and the like.

For the STA in the state to change the BSS of the connection destination, by the multi-AP controller unit 208, the AP 101 determines, based on the communication quality information obtained in step S304, whether an AP whose communication quality is higher than a second predetermined value exists on the periphery (step S305). The communication quality here is, for example, at least one of a received electric wave strength, a Signal to Noise Ratio (SNR), and a Carrier to Noise Ratio (CNR) in the STA. Also, as the second predetermined value, a value of the received electric wave strength, SNR, or CNR with which the communication quality is generally considered as excellent can be used. Upon determining that an AP whose communication quality is higher than the second predetermined value does not exist on the periphery of the STA (NO in step S305), the AP 101 ends the processing without changing the BSS of the connection destination of the STA because an AP capable of providing an excellent communication environment does not exist on the periphery of the STA.

On the other hand, upon determining, by the multi-AP controller unit 208, that an AP whose communication quality is higher than the second predetermined value exists on the periphery of the STA (YES in step S305), the AP 101 decides to change the BSS of the connection destination of the STA. In this case, the AP 101 transmits, to the agent, an instruction for changing the connection destination of the STA (step S306). Note that the AP 101 may obtain, from the agent, information representing the AP whose quality of communication with the STA is higher than the second predetermined value and which is extracted from the APs on the periphery of the STA connected to the agent. That is, the agent may collect the information of communication quality between the connected STA and each AP on the periphery of the STA, specify the AP whose communication quality is higher than the second predetermined value, and notify the AP 101 of it. In this case, the process of step S305 can be omitted. If there exist a plurality of APs whose communication quality is higher than the second predetermined value, the AP 101 can decide, for example, the AP of the best communication quality as the AP of the connection change destination. However, the present invention is not limited to this. For example, the AP of the connection change destination may be selected from the APs whose communication quality is higher than the second predetermined value at random, based on the value of the MAC address of each AP, based on the position of each AP, or based on the number of STAs connected to each AP. The AP of the connection change destination may be decided based on another reference. Note that as a control message used when transmitting this instruction, for example, a Client Steering Request message defined by the Wi-Fi EasyMesh standard can be used. The message can include the MAC address of the STA for which the BSS of the connection destination should be changed or information about BSSs before and after the change. Here, as the information of the BSS before the change, the information of the BSS currently connected to the STA is set. As the information of the BSS after the change, the information of the BSS provided by the AP whose communication quality is higher than the second predetermined value in step S305 is set. Also, this message may include a reason code representing the reason why the change of the BSS is requested. For the reason code, for example, a value representing signal quality or a value representing transmission power is set. The reason code can be used for the purpose of notifying the user of the reason of the BSS change or storing the BSS change history as log information.

With the above-described processing, if transmission power to an STA exceeds the first predetermined value, the AP 101 operating as the controller of the multi-AP network 110 can change the BSS of the connection destination of the STA. In this processing, without waiting until communication quality actually obtained in the STA lowers, the BSS of the connection destination is changed in accordance with the transmission power to the STA exceeding the first predetermined value. It is therefore possible to continuously provide the communication service of excellent communication quality to the STA.

Here, FIG. 4 shows an example of the format (Transmit Power Level TLV format) of the message to be used by an agent of the multi-AP network to report transmission power information in this embodiment. The Transmit Power Level TLV format is formed by three fields, that is, tlvType, tlvLength, and tlvValue. FIG. 4 shows an example in which the length of the tlvType field is 1 octet, and the length of the tlvLength field is 2 octets. However, the format is not limited to these fields and field lengths.

The tlvType field in the message is set to a predetermined value representing that the message is Transmit Power Level TLV. Note that the value of the tlvType field is a value that is unique to each format and is defined to identify the type of the multi-AP TLV format. In this embodiment, one of values that are not defined by the Wi-Fi EasyMesh standard at the point of time of the present application is set in the tlvType field. In the tlvLength field of the message, a value representing the size of the message, particularly, the size (for example, the number of octets) of a field following this field is stored. Note that the size of the message changes depending on the number of STAs connected to each agent of the multi-AP network. Also, the tlvValue field of the message includes the number of connected STAs (1 octet), the MAC address of each STA (6 octets each), and the transmission power level to each STA (1 octet each). The fields of the MAC address of the STA and the transmission power level to the STA are repetitively set as many as the number of connected STA.

Note that if the transmission power level to each STA can be notified, the value of each field of the Transmit Power Level TLV format is not limited to the above-described value, and an arbitrary value can be set. Also, the notification method is not limited to the notification method using the various kinds of control messages defined by the IEEE1905.1 standard, and an arbitrary notification method may be used.

Figure 5:
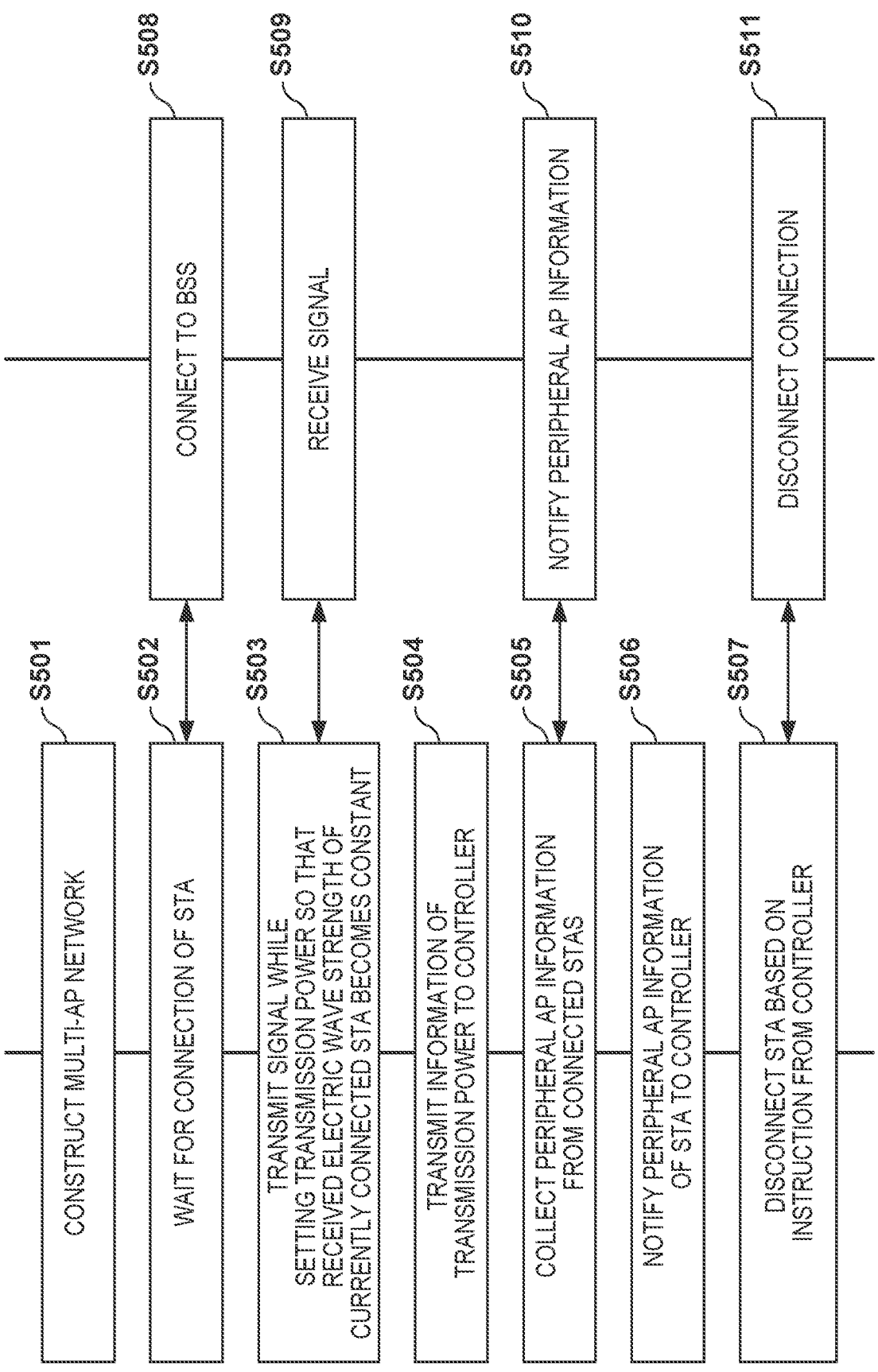
FIG. 5 is a flowchart showing an example of the procedure of processing executed between an AP and an STA before changing a connection destination.

Next, an example of processing executed between the AP 102 and the STA 104 in a case where the AP 102 is an AP operating as an agent of a multi-AP network, which provides the BSS of the connection change source of the STA 104, will be described with reference to FIG. 5.

First, by the multi-AP agent unit 209, the AP 102 serving as a multi-AP agent constructs a multi-AP network (step S501). The multi-AP network construction method is the same as described concerning step S301 of FIG. 3 described above, and a description thereof will be omitted here. By the multi-AP agent unit 209, the AP 102 waits for connection from STAs (for example, the STA 103 and the STA 104) using the fronthaul AP function (step S502). The STA 104 searches for APs on the periphery and establishes connection to a BSS provided by the AP 102 found by the search (step S508). For example, the AP 102 and the STA 104 establish connection using, for example, a Management frame of the IEEE802.11 series standard. The Management frame includes, for example, frames such as Beacon, Probe Request/Response, Authentication Request/Response, and Association Request/Response.

After the establishment of connection, the AP 102 transmits a signal while controlling transmission power such that the received electric wave strength in the connected STA 104 becomes substantially constant (step S503). The STA 104 receives the signal transmitted from the AP 102 (step S509). Normally, for example, if an electric wave is output from the AP 102 at a predetermined power, the received electric wave strength in an STA located at a long distance from the AP 102 is smaller than the received electric wave strength in an STA located at a short distance from the AP 102. For this reason, the AP 102 raises the transmission power to each STA located at a long distance from itself and controls the transmission power such that the received electric wave strength in each STA equals a target value. Note that the target value of the received electric wave strength may be equal values for a plurality of STAs or may be different values in accordance with the category of communication in each STA. Also, in the transmission power control here, the power level is controlled within the range of the maximum allowable power defined by the Radio Act of each country.

Figure 6:
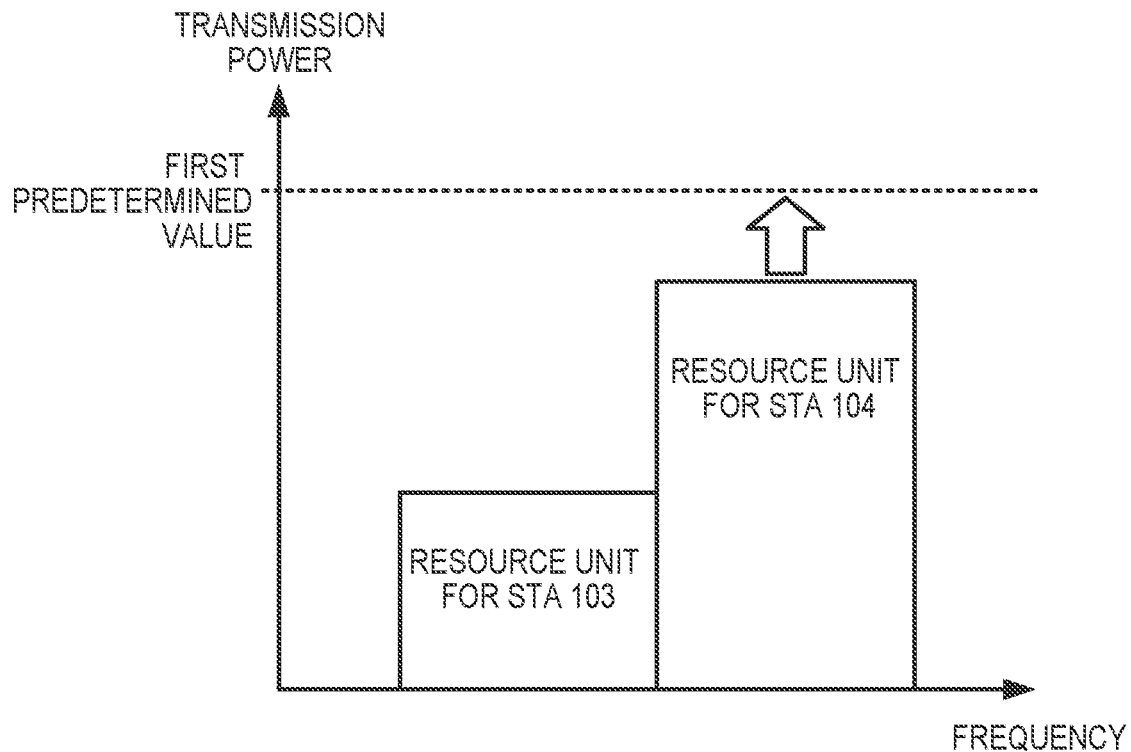
FIG. 6 is a view showing an example of the transmission power of an AP to a plurality of STAs.

Here, an example of transmission power to the STA 103 and the STA 104 in the AP 102 will be described with reference to FIG. 6. Here, the AP 102 can simultaneously communicate with the STA 103 and the STA 104 by, for example, the Orthogonal Frequency Division Multiple Access (OFDMA) function defined by the IEEE802.11ax standard. Note that the IEEE802.11ax standard defines a power boost function for transmitting a signal by setting transmission power for each resource unit. By the power boost function, the AP 102 can transmit a downlink signal to the STA 103 and the STA 104 simultaneously at different transmission powers. Here, as described in association with FIG. 1, the STA 103 does not move its position, and the distance to the AP 102 is sufficiently close and constant. For this reason, if the transmission power in the AP 102 is constant, the received power of the STA 103 is also constant. Hence, the AP 102 performs control for maintaining the transmission power to the STA 103 without changing it such that the received power of the STA 103 becomes substantially constant. On the other hand, the STA 104 moves apart from the AP 102, and the distance between the AP 102 and the STA 104 gradually increases. For this reason, the AP 102 performs control for increasing the transmission power to the STA 104 as the STA 104 moves such that the received power of the STA 104 becomes substantially constant. Note that an example in which a signal is simultaneously transmitted to a plurality of STAs using OFDMA has been described in this embodiment. However, the present invention is not limited to this. For example, the AP may perform one-to-one communication with each STA by, for example, time-divisionally communicating with one STA in one time slot, and may control the transmission power such that the received electric wave strength on the STA side does not fall below a predetermined threshold.

Referring back to FIG. 5, by the multi-AP agent unit 209, the AP 102 reports the information of the transmission power set by the communication in step S503 to the controller (step S504). For example, upon receiving a request from the controller, the AP 102 can notify the controller of the transmission power information by a response. Also, the AP 102 may notify the controller of the transmission power information periodically at a predetermined period without depending on the request from the controller. The AP 102 may notify the controller of the transmission power information at another timing by, for example, notifying the controller of transmission power information to an STA in a case where the transmission power to the STA is changed or the STA participates in the multi-AP network 110. Note that the case where an STA participates in the multi-AP network 110 can be considered as a case where an STA changes from a state in which it is not connected to the multi-AP network 110 to a state in which it is connected to the AP 102.

On the other hand, the STAs (for example, the STA 103 and the STA 104) connected to the AP 102 each execute, for example, measurement of the electric wave environment, specify APs existing on the periphery, other than the AP 102, and notify the AP 102 of the result of specifying (step S510). Each STA connected to the AP 102 notifies the AP 102 of the peripheral AP information using, for example, a method defined by the specifications of Wi-Fi Agile Multiband. Then, by the multi-AP agent unit 209, the AP 102 obtains the peripheral AP information notified from each of the connected STAs (step S505). Note that in the Wi-Fi Agile Multiband, roaming control based on the IEEE802.11k, IEEE802.11v, IEEE802.11u, and IEEE802.11r standards is performed. For example, the IEEE802.11k standard supports information exchange between an AP and an STA concerning the Wi-Fi environment, and defines a mechanism for transmitting, to the AP, the information of an AP on the periphery of an STA, the reception level of a signal of each channel in the STA, and the like. Hence, using this mechanism, the AP 102 can obtain, from a connected STA, the information of other APs existing on the periphery of the STA.

By the multi-AP agent unit 209, the AP 102 notifies the controller (AP 101) of the peripheral AP information collected from the STA (S506). For example, the AP 102 can notify the controller of the peripheral AP information using a message defined by the Wi-Fi EasyMesh standard. Note that the notification of the information has been described in association with step S304 described above, and a repetitive description thereof will be omitted here.

Finally, by the multi-AP agent unit 209, the AP 102 disconnects connection to the STA 104 based on an instruction from the controller (AP 101) (step S507). Note that the instruction from the controller can be done using a multi-AP network defined by the Wi-Fi EasyMesh standard. Note that details of the instruction from the controller have been described above in association with step S306, and a description thereof will be omitted here. In addition, the AP 102 transmits a disconnection notification such as DEAUTH or DISASSOCIATION to the STA 104, and the STA 104 disconnects connection to the BSS provided by the AP 102 based on the disconnection notification (step S511).

Figure 7:
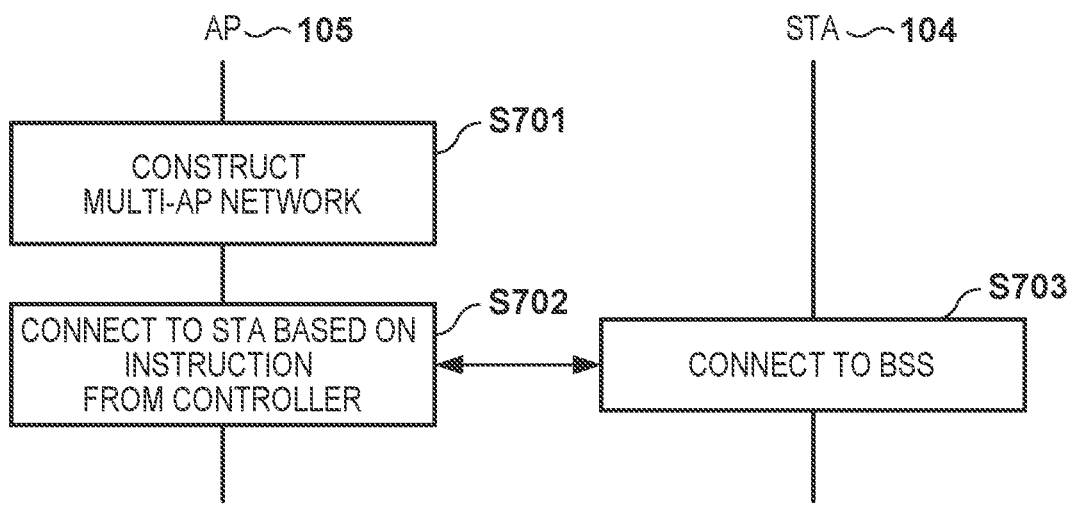
FIG. 7 is a flowchart showing an example of the procedure of processing executed between an STA and an AP of the connection destination after the change.

Next, an example of processing executed between the AP 105 and the STA 104 in a case where the AP 105 is an AP operating as an agent of a multi-AP network, which provides the BSS of the connection change destination of the STA 104, will be described with reference to FIG. 7.

First, by the multi-AP agent unit 209, the AP 105 serving as a multi-AP agent constructs a multi-AP network (step S701). The multi-AP network construction method is the same as described concerning step S301 of FIG. 3 described above, and a description thereof will be omitted here. Next, by the multi-AP agent unit 209, the AP 105 establishes connection to the STA 104 based on an instruction from the controller (AP 101) (step S702). The instruction from the controller is the same as described concerning step S306 of FIG. 3 described above, and a description thereof will be omitted here. When connecting to the STA 104, the AP 105 can use a method defined by the IEEE802.11r standard. The IEEE802.11r standard defines a method for roaming of an STA seamlessly switching connection to an AP in a Wi-Fi network to connection to another AP. In the IEEE802.11r standard, at the time of roaming of the STA, authentication of the STA can be performed at a high-speed using a function called Fast basic service set Transition (FT). The STA 104 thus establishes connection to the BSS provided by the AP 105 (step S703).

In the above-described way, the AP 102 operating as an agent of the multi-AP network 110 specifies transmission power to each connected STA. Under the control of the controller, the AP 102 causes the STA 104 whose transmission power exceeds the first predetermined value to disconnect connection to the BSS provided by the self-apparatus. Also, under the control of the controller, another AP 105 operating as an agent of the multi-AP network 110 can establish, as a new connection destination of the STA 104, connection to the STA 104 based on the communication environment between the STA 104 and the AP 105. As described above, according to this embodiment, it is possible to smoothly switch the AP of the connection destination of the STA without depending on the capability of the roaming function on the STA side and before the communication quality on the STA side degrades. This makes it possible to, for example, continuously provide, to a moving STA, communication requested to ensure high communication quality, like high-speed real-time moving image communication.

Note that in the above-described example, processing has been described in which based on the transmission power of a downlink signal from an AP to an STA, if the transmission power exceeds the first predetermined value, the AP (BSS) of the connection destination of the STA is changed. However, the present invention is not limited to this. For example, based on the transmission power of an uplink signal from an STA to an AP, if the transmission power exceeds a third predetermined value, it may be decided to change the AP (BSS) of the connection destination of the STA. In this case, the STA can notify the connected AP of the transmission power, and the AP can notify the controller of the value of the transmission power. In the measurement of communication quality for detecting APs on the periphery of an STA, the AP may measure the received strength of an electric wave sent from each STA, and APs existing on the periphery of each STA may be specified based on the measurement result. Also, in the measurement of communication quality, a signal transmitted at a predetermined power is measured, thereby estimating the magnitude of a transmission path loss and specifying an AP capable of providing sufficient communication quality to the STA. Alternatively, not the transmission power of the STA but the magnitude of the transmission path loss may be estimated, and if the transmission path loss is equal to or more than a predetermined value, it may be decided to change the AP of the connection destination of the STA. Note that in this case, the predetermined value of the transmission path loss can be set to a magnitude capable of obtaining sufficient communication quality when the AP or the STA transmits a signal at a transmission power lower than the maximum transmission power. That is, a transmission path loss capable of obtaining a predetermined margin beyond communication quality serving as a reference when a signal is transmitted at the maximum transmission power can be used as the predetermined value of the transmission path loss. According to this, in a state in which communication quality serving as a reference in transmission power control is maintained, the AP of the connection change destination capable of obtaining sufficient communication quality in the STA can be decided, and the connection destination of the STA can be changed to the AP.

Note that, for example, the extents of the areas of the BSSes provided by the APs may be different. In an example, a first BSS capable of covering a wide range and ensuring a predetermined communication speed and a second BSS capable of covering a narrow range and providing high-speed communication can be provided. In this case, for an STA connected to the second BSS, the controller may change the connection destination to the first BSS based on the transmission power exceeding the first predetermined value without depending on the peripheral AP information. In an example, if the area of the BSS has a wide range, the number of STAs existing in the area is large. For this reason, if the STAs are connected to the BSS, it may be impossible to obtain a sufficient communication speed. Hence, such an operation can be done that when another BSS having a narrow area is usable, the STAs are connected to the other BSS, and if the transmission power in the other BSS exceeds a predetermined value, the connection destination is changed to a BSS having a wide area. That is, if it is known in advance that an AP capable of ensuring predetermined communication quality (communication quality in the currently connected BSS) exists on the periphery of the STA, specifying processing of a peripheral AP may be omitted. Note that the relationship between the first BSS and the second BSS is not limited to that described above. That is, the extents of the cover ranges of the first BSS and the second BSS may substantially equal, or the first BSS may cover a narrow range. In an example, the AP that provides the first BSS may be a communication apparatus such as a smartphone having the communication function of a cellular communication system and held by a user of an STA. In this case, it is possible to use the second BSS when the second BSS is usable, and if the communication quality in the second BSS may be insufficient (if the transmission power exceeds the first predetermined value), use the second BSS. As described above, even if an AP on the periphery of an STA is not specified based on communication quality, the STA can continuously be connected to an AP capable of obtaining sufficient communication quality.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-099800, filed Jun. 21, 2022, which is hereby incorporated by reference herein in its entirety.

What is claimed is:

1. A control method for controlling a connection destination of a station in a network, the control method comprising:

obtaining information regarding transmission power used for signal transmission from a first access point to the station in the network, the first access point performing communication complying with an IEEE802.11 standard and being in communication with the station which is connected to the first access point; and executing, on a basis that the transmission power is higher than a first predetermined value, control processing for controlling the first access point and a second access point of the network such that the connection destination of the station is changed from the first access point to the second access point, wherein the second access point performs communication complying with the IEEE802.11 standard.

2. The control method according to claim 1, further comprising:
executing selection processing for selecting the second access point as the connection destination of the station from among a plurality of access points of the network, based on a communication quality between the station and each of the plurality of access points, the plurality of access points being different from the first access point and performing communication complying with the IEEE802.11 standard.

3. The control method according to claim 2, further comprising:
obtaining information regarding the communication quality between the station and each of the access points in the plurality of access points,
wherein the selection processing is processing for selecting, from among the plurality of access points, an access point whose communication quality is higher than a second predetermined value, as the second access point that is to be the connection destination of the station.

4. The control method according to claim 2, further comprising:
obtaining information regarding access points of the plurality of access points whose communication quality with respect to the station is higher than a second predetermined value,
wherein in the selection processing, the second access point that is to be the connection destination of the station is selected from among the access points whose communication quality is higher than the second predetermined value.

5. The control method according to claim 2, wherein the communication quality is at least one of a received electric wave strength, a signal to noise ratio, and a carrier to noise ratio at the station.

6. The control method according to claim 1, wherein the information regarding the transmission power in the first access point is obtained by transmitting a message for requesting the information regarding the transmission power to the first access point and receiving, from the first access point, a response that includes the information regarding the transmission power.

7. The control method according to claim 1, wherein the information regarding the transmission power in the first access point is notified from the first access point during a predetermined period, and
the information regarding the transmission power in the first access point is obtained by receiving the notification during the predetermined period.

8. The control method according to claim 1, wherein in the control processing, if the latest transmission power is higher than the first predetermined value, the first access point and the second access point are controlled such that the connection destination of the station is changed from the first access point to the second access point.

9. The control method according to claim 1, wherein in the control processing, if the transmission power is higher than the first predetermined value for a predetermined period or continuously, a predetermined number of times, the first access point and the second access point are controlled such that the connection destination of the station is changed from the first access point to the second access point.

10. The control method according to claim 1, wherein the control method is performed by a controller of a multi-access point network complying with a Wi-Fi EasyMesh® standard, and
the first access point and the second access point are agents of the multi-access point network.

11. The control method according to claim 10, wherein the controller that performs the control method also functions as an access point included in the multi-access point network.

12. An access point of a network, the access point configured to perform communication complying with the IEEE802.11 standard, and comprising:
at least one memory that stores a set of instructions; and
at least one processor that executes the instructions, the instructions, when executed, causing the access point to perform operations comprising:
notifying a control apparatus of information regarding a transmission power used for signal transmission from the access point to a connected station; and
disconnecting connection to the station based on an instruction transmitted from the control apparatus, the instruction transmitted on a basis that the transmission power is higher than a predetermined value.

13. The access point according to claim 12, wherein the operations further comprise:
notifying the control apparatus of information regarding a communication quality between the station and another access point in the network different from the access point.

14. The access point according to claim 13, wherein the communication quality is at least one of a received electric wave strength, a signal to noise ratio, and a carrier to noise ratio at the station.

15. The access point according to claim 12, wherein in a case where a message for requesting the information regarding the transmission power is received from the control apparatus, the access point transmits a response to the message, including the information regarding the transmission power, to the control apparatus, thereby notifying the information regarding the transmission power.

16. The access point according to claim 12, wherein processing for notifying the information regarding the transmission power is performed during a predetermined period.

17. The access point according to claim 12, wherein the access point is an access point functioning as an agent of the Wi-Fi EasyMesh® standard.

18. A control apparatus comprising:
at least one memory that stores a set of instructions; and
at least one processor that executes the instructions, the instructions, when executed, causing the control apparatus to perform operations comprising:
obtaining information regarding transmission power used for signal transmission from a first access point to a station in a network, the first access point performing communication complying with an IEEE802.11 standard and being in communication with the station which is connected to the first access point; and
executing, on a basis that the transmission power is higher than a first predetermined value, control processing for controlling the first access point and a second access point of the network such that the connection destination of the station is changed from the first access point to the second access point, wherein the second access point performs communication complying with the IEEE802.11 standard.

19. A non-transitory computer-readable storage medium that stores a program for causing a computer to:
  obtain information regarding transmission power used for signal transmission from a first access point to a station in a network, the first access point performing communication complying with an IEEE802.11 standard and being in communication with the station which is connected to the first access point; and
  execute, on a basis that the transmission power is higher than a first predetermined value, control processing for controlling the first access point and a second access point of the network such that the connection destination of the station is changed from the first access point to the second access point, wherein the second access point performs communication complying with the IEEE802.11 standard.

* * * * *